Oct. 13, 1931.  E. F. TRUDO  1,827,124
REMOVABLE SEAT
Filed Jan. 6, 1931
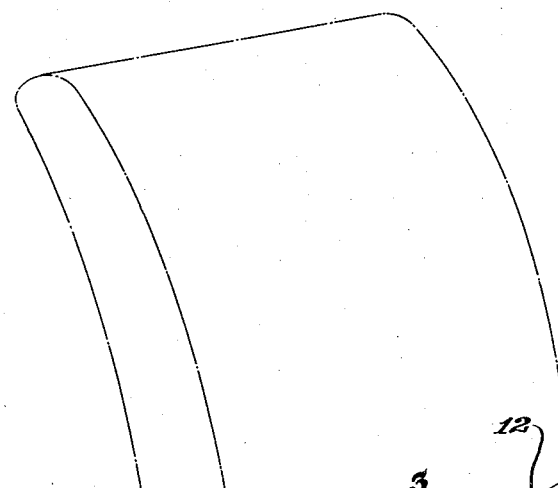
Fig.1
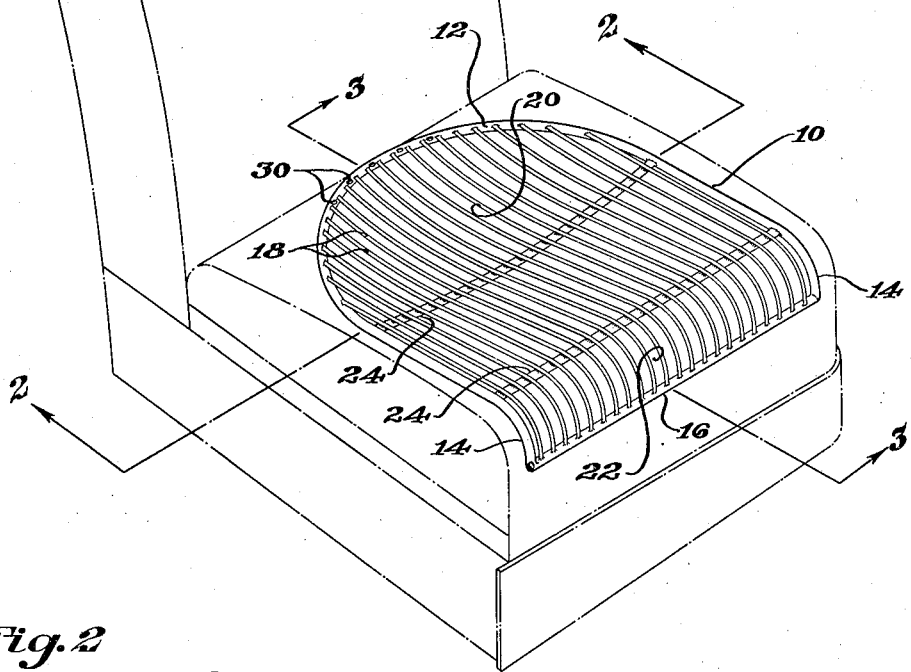
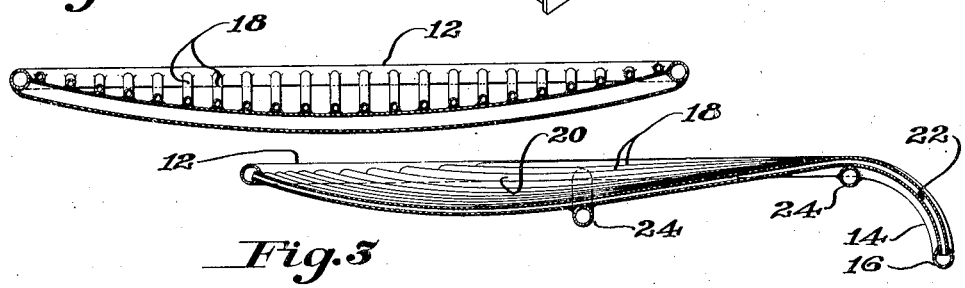
Fig.2
Fig.3
Witness
Paul F. Bryant
Inventor
Eugene F. Trudo
by his attorneys
Van Everen Fish Hildreth Harp Patented Oct. 13, 1931

1,827,124

UNITED STATES PATENT OFFICE.

EUGENE F. TRUDO, OF WESTON, MASSACHUSETTS

REMOVABLE SEAT

Application filed January 6, 1931. Serial No. 506,881.

The present invention relates to removable and replaceable seats adapted for use in motor vehicles, chairs, benches and similar articles of furniture.

It is the purpose of the present invention to provide a removable seat which may be readily employed in conjunction with the usual chair or automobile seat which is exceedingly comfortable and enables the use of the chair or automobile seat for long periods of time with a minimum of fatigue. With this underlying thought in mind I have developed a removable seat of skeleton formation, consisting essentially of spaced tubes of generally round or rounded cross-section, extending in approximate parallelism lengthwise of the seat and downwardly at the front portion of the seat to form a depending apron which merges into the seat portion proper by a well-rounded curve to avoid abrupt corners or angles. The tubes are spaced in sufficiently close proximity to afford proper support for the body, and due to the lengthwise direction and the freedom from cross-bracing or transverse supports which come in contact with the body, the entire supporting area of the seat throughout the extent of the legs down to the knees extends generally in the direction of the blood conduits in the legs, and is entirely free from any cross-bracing or similar expedient which in any way tends to cut off or restrict the circulation of blood through the lower limbs. In this respect my new seat is markedly different from any form of cushion with which I am familiar. In all types of seats at present in use, whether hard or soft, there is a tendency more or less pronounced to cut off and interfere with the circulation throughout the area of the front edge of the seat or cushion. Obviously this tendency to restriction of circulation is more pronounced in a hard seat or bench than in a relatively softer cushion. On the other hand, it is sufficiently pronounced even with a soft cushion which must have a reasonably firm supporting edge to substantially restrict circulation and cause fatigue after continued periods of use.

In addition to the seating function created by the spaced, rounded supports extending lengthwise of the legs, I further promote comfort by providing the supporting members in the form of hollow tubes which are in free communication with one another by a connection with a communicating tube connected therewith. This communicating tube and the inter-connected parallel supporting tubes through a proper arrangement of orificial openings tend to promote a circulation of air through the interior of the tubes, having for its particular purpose the maintenance of a cool seat and the removal of body heat from the seat, particularly in warm weather.

In the accompanying drawings illustrating the preferred form of the invention,

Fig. 1 represents a perspective of my improved form of removable seat superimposed on a cushion, such as an automobile cushion; and Figs. 2 and 3 are respectively transverse and longitudinal sections through the seat on the lines 2—2 and 3—3 of Fig. 1, illustrating its features of construction.

The seat shown in the illustrated embodiment of the invention comprises essentially a tubular outer frame portion, indicated generally at 10, which may have a rounded rear portion 12, and has downwardly curved and depending ends 14 at the front portion connected by a transverse tubular member 16. As indicated, the main supporting frame may be formed of a single tube, bent or otherwise formed into the requisite shape and connected to the cross tube 16 by a suitable form of welding or equivalent means of bonding. The frame 10 determines the general contour of the seat, but ordinarily is of sufficient width and length to avoid direct contact with the body of the user.

Mounted within the outer frame is a series of hollow longitudinal supports 18 which are connected to the rear portion 12 of the frame and to the front brace 16. These longitudinal supports are individually formed to present a generally concave seat portion 20, terminating in a rounded front portion 22 from which the longitudinals extend downwardly to the point of connection with the cross-member 16. The longitudinal members as a series are maintained in spaced and predetermined arrangement by a series of tubular cross braces 24, the cross brace adjacent the concave seat being curved generally as indicated, and the brace adjacent the downwardly turned portion of the seat being substantially straight. Each of the longitudinals is connected at opposite ends to the outer tubular frame in order that a free circulation of air may be secured through the outer frame and through the interior of the longitudinals. The cross braces are also connected at opposite ends to the outer frame in a manner to provide for a free circulation of air or not as desired. Circulation of air is promoted by providing a series of orificial openings 30 in the rear portion of the outer frame, and leaving the cross member 16 open at opposite ends.

A significant and important aspect of the present construction is not only the complete tubular formation by virtue of which the metallic supports are cooled by the circulation of air therethrough, but in addition the arrangement of the seat in such a fashion that the portion of the support which comes directly in contact with the body of the user consists exclusively of the longitudinal members which extend in a lengthwise direction, and in this fashion tend to avoid any impairment of circulation. This factor is of extreme importance, especially at the front portion of the seat where the pronounced edge found in the form of a relatively soft cushion creates a sufficient impairment of circulation in the lower limbs to cause a cramped, restricted feeling after extended use. With my improved construction the seat may be employed for indeterminate periods without any cramping or restriction of circulation and the resulting disadvantages thereof.

What is claimed is:

1. A removable seat comprising a continuous outer frame portion formed entirely of metal tubing vented to the atmosphere and having the entire interior throughout its length in free communication, the rim portion normally encompassing a sufficient area to avoid direct contact with the body, and a series of hollow spaced metal longitudinals connected at opposite ends of the rim portion and in free communication therewith, the hollow spaced longitudinals being curved to form a generally concave seat portion terminating at the front edge in a rounded and downwardly extending front portion and serving as the sole support for the body.

2. A removable seat comprising an outer continuous rim portion of hollow metallic tubing vented to the atmosphere and having the entire interior throughout its length in free communication, a series of hollow metallic longitudinals connected at opposite ends to the rim portion and in free communication throughout the interior, the longitudinals forming the sole support for the body, and a cross brace extending beneath the longitudinals to support and reinforce the longitudinals and in free communication at opposite ends with the hollow rim portion.

EUGENE F. TRUDO.